United States Patent Office 3,734,868
Patented May 22, 1973

3,734,868
LOAD-BEARING FLEXIBLE POLYURETHANE FOAMS AND METHOD OF MAKING THE SAME
Heinz Uelzmann, Cuyahoga Falls, and Edwin M. Maxey, Kent, Ohio, assignors to The General Tire & Rubber Company, Akron, Ohio
No Drawing. Filed Jan. 24, 1972, Ser. No. 220,426
Int. Cl. C08g 22/44
U.S. Cl. 260—2.5 AM                 19 Claims

ABSTRACT OF THE DISCLOSURE

The load carrying capacity of flexible polyurethane foams is improved by the use of minor amounts of certain primary and secondary amine compounds which are insoluble in the polyol at temperatures up to about 100° F. in conjunction with certain tertiary amine catalysts.

BACKGROUND OF THE INVENTION

In the manufacture of flexible urethane foams the ability to hold load carrying capacity constant at a constant density and in many cases the ability to achieve maximum load carrying capacity at a given density are both very important, especially from an economic standpoint and from a quality control standpoint. Load carrying capacity can be increased by increasing the polyisocyanate content. However, this is not too efficient. Also, in factory production the use of a higher isocyanate index increases the potential danger of fire in green (not completely cured) foam storage areas.

A conventional formulation includes the usual polyol, polyisocyanate, tertiary amine, water and metal-containing catalyst. The formulation is run on production equipment as commercially used to form buns, loaves or slabs having, for example, a cross section of about 30 x 76 inches and a length of about 40 feet or more. The only external heat usually applied to a bun as it moves down the conveyor is that received when it passes through an oven at a speed of about 5 to 12 feet/min. at a temperature of about 180° F. for the purpose of reducing or eliminating surface tack so that the outside paper or other sheet on which the foam is formed can be removed readily without tearing large chunks from the foam. At the end of the conveyor buns are removed and stored for about 24 hours without any external heat being applied to permit the foam to cure finally or stabilize by itself. Then the foam is slit into mattress size units or into other sizes for further manufacturing operations. Even at this time the temperature of the center of the bun is well above room temperature.

The exothermic heat of reaction of the foam-forming ingredients during foaming reaches temperatures of from about 270 to 320° F. These temperatures are determined by a pyrometer probe at the end of the conveyor line and can be higher than shown considering that the mass of the pyrometer is greater than that of the surrounding foam.

On the other hand, in the manufacture of molded polyurethane foams (for example, bucket seats for automobiles, tractor seats, truck seats, furniture seats and the like which may have a thickness of from 1 to 6 inches, a width of up to about 20 inches and a length of up to about 6 feet) the production cycle time from pouring the foam into a mold with a cover up to removal of the molded foam from the mold can vary from about 25 to 35 minutes. Since such small amounts of foaming ingredients are employed, it is necessary to heat the molds by passing them through an oven for most of the cycle to a temperature of from about 275 to 325° F. to cause the required blowing and crosslinking reactions to advance rapidly in order to reduce surface tack and to cure adequately the foam so that the foam can be removed from the mold without tearing. After the foam has been removed from the mold, the mold is subjected to a water spray to cool it. While in such a system the exothermic heat generated by the foam is generally less than that observed when making foam buns, additional heat is applied to accelerate the reaction so that the total heat involved with respect to the molded foam approaches or is equal to that observed with respect to the buns. The applied heat is necessary if the speed of production is to be maintained and molded foams are to be produced economically.

Accordingly, it is a primary object of this invention to avoid the difficulties alluded to above and to provide flexible, low density polyurethane foams which have the desired load bearing characteristics at a given density and which do not materially increase fire hazards.

This and other objects and advantages of the present invention which are apparent from the following detailed description and examples are satisfied by this invention.

SUMMARY OF THE INVENTION

According to the present invention it has been discovered that certain primary and secondary amines which in small amounts are insoluble in the polyol at a temperature up to about 100° F. can be added in conjunction with certain tertiary amine catalysts in the customary amounts to polyetherpolyol- or polyesterpolyol-polyisocyanate formulations containing water, metal catalyst and surfactant to produce low density, flexible polyurethanes which have improved load bearing characteristics at a given density and which do not increase the potential green foam storage fire hazard.

The primary and secondary amines used in the practice of the present invention have the following structural formulae:

A guanidine having the general formula:

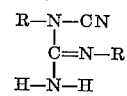

in which each R can be a hydrogen atom or a monovalent alkyl, cycloalkyl or aryl group having from 1 to 9 carbon atoms.

A guanamine having the general formula:

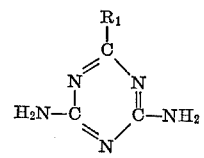

in which $R_1$ is an aryl group having 6 to 12 carbon atoms; or

An organic polyhydrazide having the general formula:

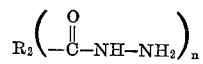

in which $R_2$ is an organic group having a valence of $n$, preferably a polyvalent alkylene group having from 1 to 8 carbon atoms such as methylene, ethylene, propylene and butylene or a polyvalent aromatic group having generally 6 to 24 carbon atoms, preferably 6 to 12 carbon atoms, such as phenylene, tolylene or xylylene, and $n$ has a value of 2 to 4. The primary amine can also be oxalyl dihydrazide in which $R_2$ is a bond between the carboxyl carbon atoms.

$R_2$ can also be a cycloalkylene group such as the cyclohexylene group or a substituted cycloalkylene group such as the 1,2-dimethyl cyclohexylene, said cycloalkylene groups preferably having from 6 to 24 carbon atoms.

The guanidines, particularly cyanoguanidine, are highly preferred as the primary amine.

The primary amines useful in this invention are insoluble in the polyol starting material at temperatures up to about 100° F., preferably up to 120° F. or more, and have at least one primary amino group, at least three nitrogen atoms and a polar cyano group having only one primary amino group. When the primary amine has at least two primary amino groups as in the case of the guanamines and the dihydrazides, the amine also contains at least two secondary amino groups or at least two imine structures. When there is no polar cyano group, the amine preferably has 4 to 5 nitrogen atoms and the pri-

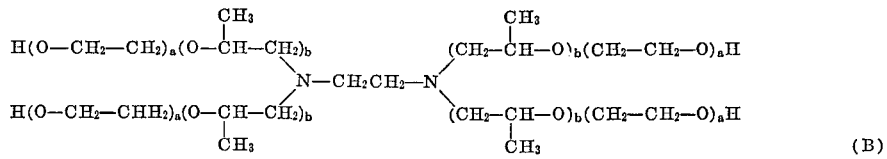

mary amino groups are connected to secondary amino groups or to carbon atoms in cyclic imine structures each of which also contains an aryl group preferably attached to the cyclic structure as in the case of benzoguanamine.

Suitable guanidines, guanamines and polyhydrazides that are insoluble in the polyol below about 100° F. include, for example, dicyandiamide; 3-benzodicyandiamide; 1,2-dimethyl dicyandiamide; 1-nonyl dicyandiamide; 2-cyclohexyl dicyandiamide; 1,1-dibutyl dicyandiamide; 3-propyl dicyandiamide; benzoguanamine; tolyl guanamine; naphthyl guanamine; terephthaloyl dihydrazide; adipyl dihydrazide; oxalyl dihydrazide; hexahydrophthaloyl dihydrazide; succinoyl dihydrazide; glutaroyl dihydrazide; sebacoyl dihydrazide; 1,1-diphenylterephthaloyl dihydrazide; 1,2-dimethylterephthaloyl dihydrazide; 1-phenyl-2-cyclohexyl adipyl dihydrazide; ethane tricarboxyl trihydrazide and the like and mixtures thereof.

These primary and secondary amines can be readily prepared by methods known to the art. For example, benzoguanamine can be prepared from benzonitrile and dicyandiamide in the presence of sodium and liquid ammonia or potassium hydroxide and dimethyl sulfoxide. Dicyandiamide can be prepared by the controlled polymerization of cyanamide in water in contact with ammonia or alkaline earth hydroxides. The dihydrazides are prepared by heating hydrazine with a dialkylester of a dicarboxylic acid in an alcohol. Still other methods can be used in preparing these amines.

Polyols used in making the polyurethanes of the present invention are primary and secondary hydroxy terminated polyoxyalkylene ethers and polyesters having from 2 to 4 hydroxyl groups and a molecular weight of from about 1,000 to 10,000. They are liquids or are capable of being liquefied or melted for handling in the polyurethane foaming apparatus or machine.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polyethylene glycols, the polypropylene glycols, and polybutylene ether glycols. Polymers and copolymers of polyoxyalkylene polyols are also adaptable in the process of this invention as well as the block copolymers of ethylene oxide and propylene oxide. Among the copolymers of polyoxyalkylene polyols that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3, glycerol, 1,2,6-hexanetriol, trimethylolpropane, trimethylolethane, tris(hydroxyphenyl)-propane, triethanolamine, triisopropanolamine, ethylenediamine, and ethanolamine. Linear and branched heteric copolyethers of ethylene oxide and propylene oxide are also useful in making the foamed products of this invention with the preferred ones being those end blocked with ethylene oxide to provide primary hydroxyl groups in the polymer and having molecular weights of from about 2000 to 5000.

Further useful types of polyetherpolyols are block copolymers prepared from propylene oxide and ethylene oxide. These polyethers can be characterized by reference to the following general formulae:

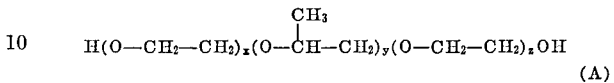

and

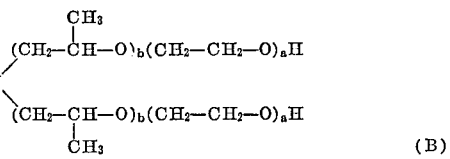

where in Formula A the total of subscripts, $x$, $y$ and $z$ represent positive integers in the range of from 22 to 70 and the total of subscripts $a$ and $b$ of Formula B represent positive integers in the range of from 20 to 100.

Polyethers having a branched chain network are also useful. Such branched chain polyethers are readily prepared from alkylene oxides of the type above described and initiators having a functionality greater than two. Branched polyethers have the advantage of making possible crosslinking without the interaction of urea or urethane groups with the isocyanate groups. This has the advantage of making a larger proportion of the isocyanate used available for the evolution of carbon dioxide and of reducing the overall amount of isocyanate that is required in the preparation of the foamed polymer. Mixtures of polyether polyols can be used.

Polyester polyols used in the practice of the present invention are made by the reaction of a major amount of a glycol and a minor amount of a dicarboxylic acid. Where branching is desired to get the required network in the urethane foam, a minor amount of a triol is employed. The total OH functionality is greater than the COOH functionality so that OH terminated polyesters are produced. Representative polyesters include polyesters prepared from ethylene glycol and adipic acid; propylene glycol and adipic acid; ethylene glycol, propylene glycol and adipic acid; ethylene glycol, propylene glycol-1,2 and azelaic acid; ethylene glycol, propylene glycol-1,2 and sebacic acid; ethylene glycol, propylene glycol-1,2 and dilinoleic acid; ethylene glycol, glycerine and adipic acid, ethylene glycol, glycerine and adipic acid; ethylene glycol, butylene glycol-1,4 and adipic acid; propylene glycol-1,3 trimethylol propane and adipic acid; ethylene glycol, pentanediol-1,4 and adipic acid; ethylene glycol, glycerine monoisopropyl ether and adipic acid; propylene glycol-1,2 1,2,6-hexane triol and adipic acid; ethylene glycol, propylene glycol-1,2 maleic acid and adipic acid; ethylene glycol, dipropylene glycol and adipic acid; butylene glycol, propylene glycol-1,2 and adipic acid; ethylene glycol, butylene glycol-1,4 and sebacic acid; propylene glycol, diethylene glycol and adipic acid; ethylene glycol, propylene glycol-1,2 and adipic acid; diethylene glycol, propylene glycol-1,2 and azelaic acid and the like.

These polyesters are reaction products of polyols, such as the aforementioned aliphatic polyols and in particular the class of aliphatic polyols containing from two to ten carbon atoms, with polycarboxylic acids having from two to thirty-six carbon atoms, e.g., oxalic acid, succinic acid, maleic acid, adipic acid, sebacic acid, isosebacic acids, phthalic acids, and dimer acids such as those obtained by coupling two molecules of linoleic acid. Mixtures of polyester polyols can be used. Likewise, there can be used as polyols grafts of ethylenically unsaturated monomers such as acrylonitrile, methacrylonitrile, vinyl acetate, methyl acrylate and the like on the polyols or polyesters and having the functionality and molecular weight as shown above. Such graft polyols and methods for making the same are shown in the U.S. patents to Stamberger Nos. 3,304,273 and 3,383,351 and the U.S. patent to Von Bonin No. 3,294,711.

When desired, cross-linking materials having from 2 to 8 hydroxyl groups can be included in the foam formulations to increase cross-link density and so forth. They have molecular weights of from about 60 to 600. Only small amounts of such materials are generally needed (about 0.3 to 10 mols per 100 mols of polyol). Examples of such crosslinking agents are glycol, diethylene glycol, propylene glycol, butane diol-1,4, dipropylene glycol, glycerol, trimethylolpropane, butanetriols, hexanetriols, trimethylolphenol, tris(hydroxyphenyl) propane, tris(hydroxyxylyl) propane, various tetraols, such as erythritol and pentaerythritol; pentols; hexols, such as dipentaerythritol and sorbitol, as well as alkyl glucosides, carbohydrates, polyhydroxy fatty acid esters such as castor oil, and polyoxyalkylated derivatives or polyfunctional compounds having three or more reactive hydrogen atoms, such as, for example, the reaction product of trimethylolpropane, glycerol, 1,2,6-hexane triol, sorbitol and other polyols with ethylene oxide, propylene oxide or other alkylene epoxide or copolymers thereof, e.g., copolymers of ethylene and propylene oxides. Grafted crosslinkers can be prepared by the processes of the aforementioned Stamberger and Von Bonin U.S. patents. Mixtures of crosslinkers can be used. The crosslinkers, polyethers, polyesters and graft polyols of the same as well as the polyisocyanates disclosed herein i.e., the polymer forming materials should be free of amino groups or, if they are present, they should be sterically hindered or shielded.

Any organic di- or tri-isocyanate can be used in the practice of the present invention. Diisocyanates are preferred, particularly when there is any considerable amount of branching in the polyol or crosslinker, to avoid the formation of rigid or semi-rigid foams. Examples of suitable organic polyisocyanates to use are ethylene diisocyanate, trimethylene diisocyanate, tetramethylene diisocyanate, pentamethylene diisocyanate, hexamethylene diisocyanate, propylene-1,2-diisocyanate, butylene-1,2-diisocyanate, butylene-1,3-diisocyanate, butylene-2,3-diisocyanate, alkylidine diisocyanates such as ethylidine diisocyanate and butylidine diisocyanate; cycloalkylene diisocyanates such as cyclopentylene-1,3-diisocyanate, cyclohexylene-1, 2-diisocyanate, cyclohexylene - 1,3 - diisocyanate, and cyclohexylene-1,4-diisocyanate; cycloalkylidene diisocyanate such as cyclopentylidene diisocyanate and cyclohexylidene diisocyanate; aromatic diisocyanates such as m-phenylene diisocyanate, p-phenylene diisocyanate, polymethylene polyphenylisocyanate, 2,4-tolylene diisocyanate, 2,6-tolylene diisocyanate, bitolylene diisocyanate, naphthalene-1,4-diisocyanate and diphenylene-4,4′-diisocyanate; aliphatic-aromatic diisocyanates such as xylylene-1,4-diisocyanate, xylylene-1,3-diisocyanate, bis-(4-isocyanato-phenyl) methane, bis(3 - methyl-4-isocyanatophenyl)methane, and 4,4′ - diphenylpropane diisocyanate, durylene diisocyanate, 4,4′,4″-tris(isocyanatophenyl)methane, 3,10 - diisocyanatotricyclo [5.2.1.0²⁶]decane, bis-(2-isocyanatoethyl)carbonate, and naphthalene triisocyanate and the like. Mixtures of polyisocyanates can be used.

The amount of polyisocyanate employed ranges from about 0.70 to 1.35 total mols of NCO (in the polyisocyanates) per total mol of active hydrogen (as determined by the Zerewitinoff method, J.A.C.S., vol. 49, p. 3181 (1927) in the polyols, crosslinkers, water, halogen-containing resins (such as partially hydrolyzed vinyl chloride-vinyl acetate copolymers) and any other active hydrogen containing material in the polyurethane foam formulation.

Water is used as a blowing agent and should be substantially or essentially pure, that is, it should be free of impurities such as ions, sols and the like of mineral, vegetable, or synthetic origin and the like which would adversely affect the foaming action or the properties of the resultant polyurethane foam. Deionized, distilled or otherwise purified water should be employed.

The water is employed in amounts of from about 1.5 to 5 parts by weight per 100 parts by weight of the polyol.

If lower density and softer foams are desired there additionally can be added to the polyurethane foam formulation separately or in admixture with one of the other components, such as the polyol or polyisocyanate, up to about 25 parts by weight of a fluorocarbon blowing agent per 100 parts by weight of the polyol. Examples of such blowing agents are those fluorine-substituted aliphatic hydrocarbons which have boiling points between about −40° C. and +170° C. and which vaporize at or below the temperature of the foaming mass. The blowing agents include, for example, trichloromonofluoromethane, dichlorodifluoromethane, dichloromonofluoromethane, bromotrifluoromethane, chlorodifluoromethane, 1,1-dichloro-1-fluoroethane, 1,1 - difluoro-1,2,2-trichloroethane, chloropentafluoroethane, 1-chloro-1-fluoroethane, 1-chloro-2-fluoroethane, 1,2 - trichloro - 1,2,2-trifluoroethane, 1,1,1-trichloro-2,2,2-trifluoroethane, 2 - chloro-nonafluorobutane, hexafluorocyclobutene, and octafluorocyclobutane. Still other easily vaporizable fluorocarbons can be used. Mixtures of the fluorocarbons can be used. Still other blowing agents can be used in full or partial replacement of the fluorocarbons such as propane, butane, pentane, pentene, hexane and so forth and mixtures thereof, particularly where precautions are taken to prevent explosions or where removal of the gases is provided. See U.S. Pats. Nos. 3,072,582 and 3,391,093.

The polyurethane foaming composition or formulation can also contain one or more sterically hindered tertiary amines selected from the group consisting of

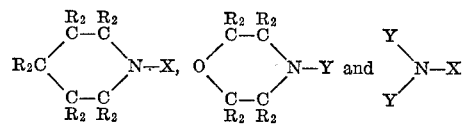

in which each X is an alkyl or alkenyl group having from 1 to 18 carbon atoms; and unsubstituted cycloaliphatic hydrocarbon group, alkyl substituted cycloaliphatic hydrocarbon group or cycloaliphatic alkylene hydrocarbon group, said cycloaliphatic groups having a ring of from 4 to 8 carbon atoms and up to a total of 16 carbon atoms; or an unsubstituted aromatic hydrocarbon group, an alkyl substituted aromatic hydrocarbon group or an aromatic alkylene hydrocarbon group, said aromatic groups containing one benzene ring and from 6 to 16 carbon atoms;

in which each Y is an unsubstituted cycloaliphatic group, an alkyl substituted cycloaliphatic hydrocarbon group or a cycloaliphatic alkylene hydrocarbon group, said cycloaliphatic groups having a ring of from 4 to 8 carbon atoms and containing up to a total of 16 carbon atoms; or an unsubstituted aromatic hydrocarbon group, an alkyl substituted aromatic hydrocarbon group or an aromatic alkylene hydrocarbon group, said aromatic groups containing one benzene ring and from 6 to 16 carbon atoms; and in which each R is a hydrogen atom or an alkyl group of from 1 to 4 carbon atoms, the maximum number of said alkyl groups being 4.

Examples of such sterically hindered tertiary amines are N-hexyl dicyclohexyl amine; methyl dicyclohexyl amine; butyl dichlohexylamine; octadecyl dicyclohexylamine; ethyl cyclohexyl phenylamine; dicyclohexyl phenyl amine; triphenyl amine; N,N-dibenzyl aniline; dibenzyl cyclohexylamine; tricyclohexylamine; tricyclooctyl amine;

tri(1-cyclohexyl-ethyl-2) amine; di-(tert-butyl-cyclohexyl) methyl amine; (2-ethyl-1-hexenyl)di-phenyl amine; 1(2-ethyl-1-hexenyl)piperidine; 1(tolyl)piperidine; 1(cyclobutyl)-3-butyl piperidine; 1(cycloheptyl)-2,3,6-trimethyl piperidine; 1(cyclohexyl)-2,2,6,6-tetramethyl piperidine; N-phenyl dicyclohexyl amine; N-p-tolyl dicyclohexyl amine; N-benzyl dicyclohexyl amine; N-methyl diphenyl amine; 4(cyclopentyl) morpholine; 4(cyclohexyl)-2,6-dimethyl morpholine; 4(benzyl) morpholine; and 4(m-cumenyl) morpholine. The tertiary amines are well known and can be made by known processes; for example, they can be prepared by methods shown by Fieser and Fieser, "Organic Chemistry," D. C Heath and Company, Boston, 1944.

These hindered tertiary amines can be used in amounts up to about 3 parts by weight based on 100 parts by weight of the polyol, but it is preferred to use no more than about 0.9 part by weight of the amine per 100 parts by weight of the polyether polyol.

Surfactants or emulsifiers are necessary to provide the desired cell formation and growth. Polysiloxane-polyoxyalkylene block copolymers are described in U.S. Pats. 2,834,748 and 2,917,480. Another useful class of emulsifiers are the "nonhydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group and (b) an alkali metal salt of a polyoxyalkylene polymer to a temperature sufficient to cause the polysiloxane polymer and the salt to react to form the block copolymer. Although the use of an emulsifier is desirable to influence the type of foam structure that is formed, the foam products of the invention can be prepared without emulsifiers. Still other polysiloxane-polyoxyalkylene copolymers known to the art may be employed as well as silicones, turkey red oil and so forth. The surfactant is used in an amount of from about 0.3 to 2.5 parts by weight per 100 parts by weight of the polyether or ester polyol.

Other well known constituents can be added to the polyurethane foam recipe such as barium and cadmium salts of carboxylic acids, clay, talc, $TiO_2$, silica and hydrated silica, $CaCO_3$, metal chromates, barytes, phthalocyanine green or blue pigments, red ion oxide, conventional stabilizers, carbon black, dyes, toners, epoxidized soy bean oil (Paraplex G–62), epoxides (Epon 838), tricresyl phosphate, zinc oxide, antimony oxide, antioxidants, fungicides, bacteriostats and the like. These constituents can be added in various amounts to the foaming ingredients to achieve the desired properties in the resultant flexible, low density foams.

The flexible, cellular urethane polymeric foams of the present invention can be used as cushions, mattresses, pillows, cushioning materials for furniture and automobiles, rug underlay and especially as interior automobile door panels, head rests and so forth.

The preparation of the polyurethane foams of the present invention can be formed by a process known in the art as the "one-shot" process or by a two step process involving, first, the preparation of a "prepolymer," the well-known "semiprepolymer" or "quasiprepolymer" technique. There all or a portion of the polyol is reacted with all of the organic polyisocyanate, providing a reaction product which contains a high percentage of free isocyanate groups and which is reacted with the remaining portion of the hydroxyl-terminated polyol or a crosslinker, together with water and catalysts to form a rubbery, cellular, elastic product.

The following examples are merely illustrative and are not intended to limit the invention, the scope of which is delineated in the claims.

EXAMPLE I

Flexible polyurethane foams were prepared according to the recipes given below and tested as reported below:

|  | A | B | C | D |
|---|---|---|---|---|
| Ingredients (parts by wt.): |  |  |  |  |
| Polyoxypropylenetriol (approx. 3,000 M.W.) | 100 | 100 | 100 | 100 |
| Stannous octoate | 0.35 | 0.35 | 0.35 | 0.35 |
| Triethylene diamine 33% solution in dipropylene glycol | 0.20 | 0.20 | 0.20 | 0.20 |
| Polysiloxane-polyoxyalkylene block copolymer | 1.00 | 1.00 | 1.00 | 1.00 |
| Water | 4.00 | 4.00 | 4.00 | 4.00 |
| Benzoguanamine |  | 4.00 |  |  |
| Cyanoguanidine |  |  | 2.00 |  |
| 80/20 ratio of 2,4- and 2,6-toluene diisocyanates | 52 | 56 | 56 | 56 |
| Properties: |  |  |  |  |
| Density, p.c.f. | 1.57 | 1.52 | 1.50 | 1.50 |
| Tensile, p.s.i. | 11.1 | 11.1 | 11.2 | 10.3 |
| Elongation, percent | 205 | 160 | 160 | 165 |
| Tear, p.l.i. | 2.90 | 2.60 | 2.60 | 2.40 |
| Compression loads, lbs., 4 x 4 x 2" sample: |  |  |  |  |
| 25% deflection | 5.3 | 5.9 | 6.4 | 5.5 |
| Percent increase of A (Control) |  | 11.0 | 21 | 4 |
| 65% deflection | 11.4 | 13.7 | 13.3 | 11.3 |
| Percent increase over A (Control) |  | 20 | 17 | −1 |
| Load factor | 15 | 2.32 | 2.08 | 2.0 |

It can be seen in Example I that the benzoguanamine and the cyanoguanidine provide the low density polyurethane foams with outstanding load carry capacity with little or no adverse effect on foam processing, density and properties. The foams C and D show marked improvement in the load carrying capacity without resorting to the use of increased diisocyanate and its problems of increased fire hazard as well as loss of desirable properties of tensile elongation and tear.

It can be seen that the preferred primary amine, cyanoguanidine (Example I–D), provided outstanding results at only 2 parts by weight or about 1¼ parts by weight per 100 parts by weight of polyol and polyisocyanate.

In general, the primary amine can be used in amounts of about 1 to 3.5 parts and preferably about 1.25 to 2.5 parts by weight per 100 parts by weight of polyol and polyisocyanate. Usually more than 3.5 or 4 parts by weight are economically wasteful.

The preferred amine compound, cyanoguanidine, has a polar cyano group which apparently gives it, at least in part, some of its solubility properties in the polyol material.

The guanamines such as benzoguanamine, in addition to two $-NH_2$ groups, has an aryl hydrocarbon group which may help to render it insoluble in the polyol to temperatures up to 95° or 100° F.

The following examples illustrate that suitable primary amines are dihydrazides of organic dicarboxylic acids, such amines being prepared, for instance, by the reaction of hydrazine with dialkylesters of organic dicarboxylic acids in which the alkyl group has 1 to 6 carbon atoms and the dicarboxylic acid is oxalic, adipic or terephthalic acid.

EXAMPLE II

Flexible polyurethane foams having improved load-carrying capacity were prepared according to the recipes set forth below and tested as reported below:

| | E | F | G | H |
|---|---|---|---|---|
| Ingredients (parts by wt.): | | | | |
| Polyoxypropylene (avg. mol. wt., 3,000) | 100 | 100 | 100 | 100 |
| Water | 4 | 4 | 4 | 4 |
| Stannous octoate | 0.35 | 0.35 | 0.35 | 0.35 |
| Polysiloxane-polyoxyalkylene black copolymer (surfactant) | 1.0 | 1.0 | 1.0 | 1.0 |
| Terephthoyl dihydrazide | | 5 | | |
| Adipic dihydrazide | | | 5 | |
| Oxalic dihydrazide | | | | 3 |
| Tolylene diisocyanate (80/20 isomer wt. ratio of 2,4- and 2,6-isomers) | 52 | 56 | 56 | 56 |
| Triethylene diamine, 33% solvent in dipropylene glycol | 0.2 | 0.2 | 0.2 | 0.2 |
| Properties: | | | | |
| Density, p.c.f. | 1.51 | 1.55 | 1.54 | 1.54 |
| Tensile, p.s.i. | 14.4 | 10.9 | 11.5 | 12.0 |
| Elongation, percent | 180 | 115 | 150 | 180 |
| Tear, p.l.i. | 2.85 | 2.40 | 2.35 | 2.85 |
| Compression loads, lbs., 4 x 4 x 2" samples: | | | | |
| 25% deflection | 4.9 | 6.1 | 7.5 | 6.7 |
| Percent increase of E (Control) | | 20 | 35 | 27 |
| 65% deflection | 9.6 | 13.2 | 15.1 | 13.0 |
| Percent increase over E (Control) | | 27 | 36 | 26 |
| Load factor | 1.96 | 2.17 | 2.01 | 1.94 |

The foams containing the dihydrazides, Foams F, G and H, had the same cream time, rise time, cure time and cell structure as the control formulation Foam E.

It can be seen that the use of the dihydrazides with two —NH$_2$ groups and two —NH— groups, which are insoluble in the polyol up to about 95 or 100° F., markedly increases foam load-carrying capacity without sacrificing desirable processing and foam properties. It can be seen that the use of the certain primary amines, the dihydrazides, enable one to obtain a constant load-carrying capacity at a given density and to meet a certain specified load-carrying capacity at a lower density.

EXAMPLE III

Two foams containing organic dihydrozides were heat aged for 24 hours at 284° F. along with a control foam to illustrate excellent heat stability of the dihydrazide-containing foams.

The foams were prepared from the recipes that follow and were tested as indicated:

| | J | K | L |
|---|---|---|---|
| Ingredients (part by wt.): | | | |
| Polyoxypropylene triol (3,000 M.W.) | 100 | 100 | 100 |
| Polysiloxane-polyoxyalkylene black copolymer (surfactant) | 1 | 1 | 1 |
| Stannous octoate | 0.4 | 0.4 | 0.4 |
| Water | 4.0 | 4.0 | 4.0 |
| N,N,N',N'-tetramethyl butanediamine | 0.05 | 0.05 | 0.05 |
| N-methyl morpholine | 0.6 | 0.6 | 0.6 |
| 80/20 wt. ratio of 2,4- and 2,6-isomers of tolylene diisocyanate | 52 | 56 | 56 |
| Terephthalic dihydrazide | | 5 | |
| Oxalic dihydrazide | | | 3 |
| Properties: | | | |
| Compression loads, lbs., original: | | | |
| 25% deflection | 6.7 | 7.6 | 5.4 |
| 65% deflection | 14.1 | 15.5 | 10.8 |
| After aging: | | | |
| 25% deflection | 6.7 | 8.4 | 5.5 |
| 65% deflection | 14.9 | 17.8 | 11.2 |
| Percent change (aging/original): | | | |
| 25% deflection | 0 | +11.4 | +15.2 |
| 65% deflection | +5.8 | +1.8 | +3.6 |

The above data clearly shows that foams K and L (with dihydrazides were not effected by heat aging or increased markedly in load-carrying capacity.

In Example I, other guanidine compounds set forth as being useful can be substituted in whole or part for the cyanoguanidine used to provide substantially equivalent results.

In Example I, other guanamines containing an aryl hydrocarbon group as set forth as being useful can be employed in place of the benzoguanamine used to provide substantially equivalent results.

In Examples II and III, other organic dihydrazides described as being useful can be employed in place of the dihydrazides used to provide substantially equivalent results.

EXAMPLE IV

Run II-E was repeated as Run IV-M and compared with a similar formulation IV-N containing 0.40 part of stannous octoate instead of 0.35 part of stannous octoate and containing additionally 3.4 parts by weight of ethane tricarboxy trihydrazide. The resulting foams had the following properties:

| | M | N |
|---|---|---|
| Density, p.c.t. | 1.49 | 1.48 |
| Compression loads, lbs., 4 x 4 x 2" sample: | | |
| 25% deflection | 5.4 | 8.3 |
| Percent increase over M | | 54 |
| 65% deflection | 10.4 | 15.6 |
| Percent increase over N | | 50 |

What is claimed is:

1. In a method of producing a flexible polyurethane foam comprising reacting at least one organic polyisocyanate with at least one polyol in the presence of a blowing agent and a tertiary amine catalyst, the improvement comprising reacting the polyisocyanate and polyol in the presence of a primary amine having from one to four primary amino groups and at least 3 nitrogen atoms, such that when the primary amine has only one primary amino group, there is a cyano group, and when the primary amine has more than one primary amino group, there are at least two secondary amino groups or there are at least two imine structures and one aromatic radical, the primary amine being insoluble in the polyol at temperatures up to about 100° F. and used in an amount effective to provide improved load bearing capacity.

2. A method as defined in claim 1 in which the primary amine is selected from the group consisting of:
a guanidine having the general formula:

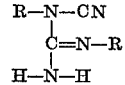

in which each R is selected from the group consisting of the hydrogen atom and monovalent alkyl, cycloalkyl and aryl groups, any of said monovalent groups containing from 1 to 9 carbon atoms;
a guanamine having the general formula:

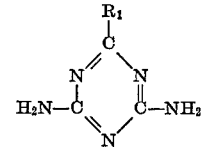

in which $R_1$ is an aryl group having 6 to 12 carbon atoms; and
an organic polyhydrazide having the general formula:

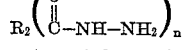

in which $R_2$ is selected from the class consisting of a bond between two adjacent carboxyl carbon atoms depicted in the general formula and of organic groups having a valence of $n$ where $n$ has a value of 2 to 4, said organic groups being selected from the class consisting of polyvalent alkylene groups containing 1 to 8 carbon atoms, polyvalent aromatic groups containing 6 to 24 carbon atoms and polyvalent cycloalkylene groups containing 6 to 24 carbon atoms.

3. A method as defined in claim 2 in which the primary amine is cyanoguanamine.

4. A method as defined in claim 2 in which the primary amine is a dihydrazide of an organic dicarboxylic acid.

5. A method as defined in claim 4 in which the organic acid is adipic acid.

6. A method as defined in claim 4 in which the organic acid is oxalic acid.

7. A method as defined in claim 4 in which the organic acid is terephthalic acid.

8. A method as defined in claim 2 in which the primary amine is benzoguanamine.

9. A method as defined in claim 1 in which the amount of primary amine is about 1 to 3½ parts by weight per 100 parts by weight of the polyol and polyisocyanate.

10. A method as defined in claim 1 in which the amount of primary amine is about 1½ to 2½ parts by weight per 100 parts by weight of the polyol and polyisocyanate.

11. A flexible polyurethane foam having improved load bearing capacity prepared by the reaction of:
a polyol,
an organic polyisocyanate,
a blowing agent,
a tertiary amine catalyst, and
an effective load-bearing capacity improving amount of a primary amine having from one to four primary amino groups and at least 3 nitrogen atoms, the primary amine being insoluble in the polyol at temperatures up to about 100° F., such that when the primary amine has only one primary amino group, there is a cyano group, and when the primary amine has more than one primary amino group, there are at least two secondary amino groups or there are at least two amine structures and one aromatic radical.

12. A foam as defined in claim 11 in which the primary amine is cyanoguanidine.

13. A foam as defined in claim 11 in which the primary amine is benzoguanamine.

14. A foam as defined in claim 11 in which the primary amine is oxalic dihydrazide.

15. A foam as defined in claim 11 in which the primary amine is adipic dihydrazide.

16. A foam as defined in claim 11 in which the primary amine is terephthalic dihydrazide.

17. A foam as defined in claim 11 in which the primary amine is selected from the group consisting of:
a guanidine having the general formula:

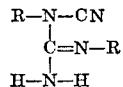

in which each R is selected from the group consisting of the hydrogen atom and monovalent alkyl, cycloalkyl and aryl groups, any of said monovalent groups containing from 1 to 9 carbon atoms;
a guanamine having the general formula:

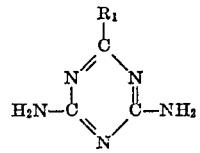

in which $R_1$ is an aryl group having 6 to 12 carbon atoms; and
an organic polyhydrazide having the general formula:

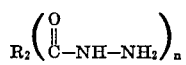

in which $R_2$ is selected from the class consisting of a bond between two adjacent carboxyl carbon atoms depicted in the general formula and of organic groups having a valence of $n$ where $n$ has a value of 2 to 4, said organic groups being selected from the class consisting of polyvalent alkylene groups containing 1 to 8 carbon atoms, polyvalent aromatic groups containing 6 to 24 carbon atoms and polyvalent cycloalkylene groups containing 6 to 24 carbon atoms.

18. A foam as defined in claim 11 in which the amount of primary amine is about 1 to 3½ parts by weight per 100 parts by weight of the polyol and polyisocyanate.

19. A foam as defined in claim 11 in which the amount of primary amine is about 1½ to 2½ parts by weight per 100 parts by weight of the polyol and polyisocyanate.

References Cited
UNITED STATES PATENTS
3,216,975   11/1965   Kunde et al. ____ 260—77.5 AM OTHER REFERENCES
Saunders et al.: Polyurethanes, Part II, Interscience, New York, 1964, pp. 4–7.

DONALD E. CZAJA, Primary Examiner
M. J. WELSH, Assistant Examiner

U.S. Cl. X.R.
260—2.5 AK

UNITED STATES PATENT OFFICE
CERTIFICATE OF CORRECTION

Patent No. 3,734,868  Dated May 22, 1973

Inventor(s) Heinz Uelzmann and Edwin M. Maxey

It is certified that error appears in the above-identified patent and that said Letters Patent are hereby corrected as shown below:

Column 6, line 19, which reads: "1,2 - trichloro" should read ---1,1,2-trichloro---.

Column 8, line 32, which reads: "$2.0_0$" should read ---2.00---.

Column 11, line 26, which reads: "amine" should read ---imine---.

Column 11, line 26, "cyanoguanidine" should read --cyanoguanadine--.

Signed and sealed this 8th day of January 1974.

(SEAL)
Attest:

EDWARD M. FLETCHER, JR.
Attesting Officer

RENE D. TEGTMEYER
Acting Commissioner of Patents